United States Patent
Morikubo et al.

(10) Patent No.: US 12,179,354 B2
(45) Date of Patent: Dec. 31, 2024

(54) ARTICLE TRANSFER FACILITY

(71) Applicant: Daifuku Co., Ltd., Osaka (JP)

(72) Inventors: Mitsuo Morikubo, Tokyo (JP);
Yoshikazu Tai, Tokyo (JP); Masami Iwai, Tokyo (JP); Takuya Gondoh, Tokyo (JP); Atsushi Minoo, Tokyo (JP); Kazuyoshi Ohgita, Hinocho (JP); Manabu Onayama, Hinocho (JP); Kiyoji Mori, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 518 days.

(21) Appl. No.: 17/293,635

(22) PCT Filed: Nov. 12, 2019

(86) PCT No.: PCT/JP2019/044371
§ 371 (c)(1),
(2) Date: May 13, 2021

(87) PCT Pub. No.: WO2020/100907
PCT Pub. Date: May 22, 2020

(65) Prior Publication Data
US 2022/0009090 A1    Jan. 13, 2022

(30) Foreign Application Priority Data

Nov. 14, 2018  (JP) ................................ 2018-213660

(51) Int. Cl.
*B65G 61/00* (2006.01)
*B25J 9/16* (2006.01)
(Continued)

(52) U.S. Cl.
CPC ................. *B25J 9/16* (2013.01); *B25J 13/08* (2013.01); *B65B 5/08* (2013.01); *B65B 17/00* (2013.01); *B65G 47/90* (2013.01); *B65G 57/04* (2013.01)

(58) Field of Classification Search
CPC .. B25J 9/16; B25J 13/08; B25J 9/0093; B65B 5/08; B65B 17/00; B65B 5/105;
(Continued)

(56) References Cited

U.S. PATENT DOCUMENTS

2014/0003902 A1 *  1/2014  Inui ...................... B65G 1/0428
414/749.1
2014/0079524 A1 *  3/2014  Shimono .......... G05B 19/41815
414/801
(Continued)

FOREIGN PATENT DOCUMENTS

CN  106891920 A * 6/2017 ............... B62B 3/02
JP  2004141980 A * 5/2004
(Continued)

OTHER PUBLICATIONS

CN106891920A_Tilting-type_collecting_device (Year: 2017).*
(Continued)

*Primary Examiner* — Jonathan L Sample
*Assistant Examiner* — Shaheda Shabnam Hoque
(74) *Attorney, Agent, or Firm* — The Webb Law Firm

(57) ABSTRACT

An article transfer facility (100) includes a transfer device (3) that performs a first operation to take out an article (W) that are supported by a first container (C1), from the first container (C1), and a second operation to load the article (W) taken out from the first container (C1), onto a second container (C2); and an inclination device (5) that supports the second container (C2) at a predetermined position (P2), wherein the second container (C2) has a rectangular mount-
(Continued)

ing surface (S) onto which the articles (W) are to be mounted, and is formed in a box shape with an open upper surface, and the inclination device (5) supports the second container (C2) in an inclined state such that a target corner portion (Sct) that is one of a plurality of corner portions (Sc) of the mounting surface (S) is located lower than the other corner portions (Sc).

13 Claims, 8 Drawing Sheets

(51) Int. Cl.
  *B25J 13/08* (2006.01)
  *B65B 5/08* (2006.01)
  *B65B 17/00* (2006.01)
  *B65G 47/90* (2006.01)
  *B65G 57/04* (2006.01)

(58) Field of Classification Search
  CPC ...... B65G 47/90; B65G 57/04; B65G 47/917; B65G 2201/0258; B65G 2203/0233; B65G 2203/041; B65G 61/00; B65G 47/91; B65G 60/00; B65G 2201/02
  See application file for complete search history.

(56) References Cited

U.S. PATENT DOCUMENTS

| | | | |
|---|---|---|---|
| 2014/0236343 A1* | 8/2014 | Hill | B65G 1/1375 700/216 |
| 2018/0065818 A1* | 3/2018 | Gondoh | B65G 47/24 |
| 2018/0141754 A1* | 5/2018 | Garrett | B65G 47/52 |
| 2018/0178992 A1 | 6/2018 | Gondoh et al. | |

FOREIGN PATENT DOCUMENTS

| | | | | |
|---|---|---|---|---|
| JP | 200745499 | A | | 2/2007 |
| JP | 2008285290 | A | * | 11/2008 |
| JP | 2014043322 | A | * | 3/2014 |
| JP | 5574760 | B2 | * | 8/2014 |
| JP | 5627120 | B2 | * | 11/2014 |
| JP | 5752165 | B2 | * | 7/2015 |
| JP | 2018104126 | A | | 7/2018 |
| JP | 201942828 | A | | 3/2019 |
| TW | 200936471 | A | | 9/2009 |

OTHER PUBLICATIONS

JP5574760B2_InclinedCarriage (Year: 2014).*
CN106891920A_Tilting-type_collecting_device_drawings (Year: 2017).*
JP5574760B2_InclinedCarriageDrawings (Year: 2014).*

* cited by examiner

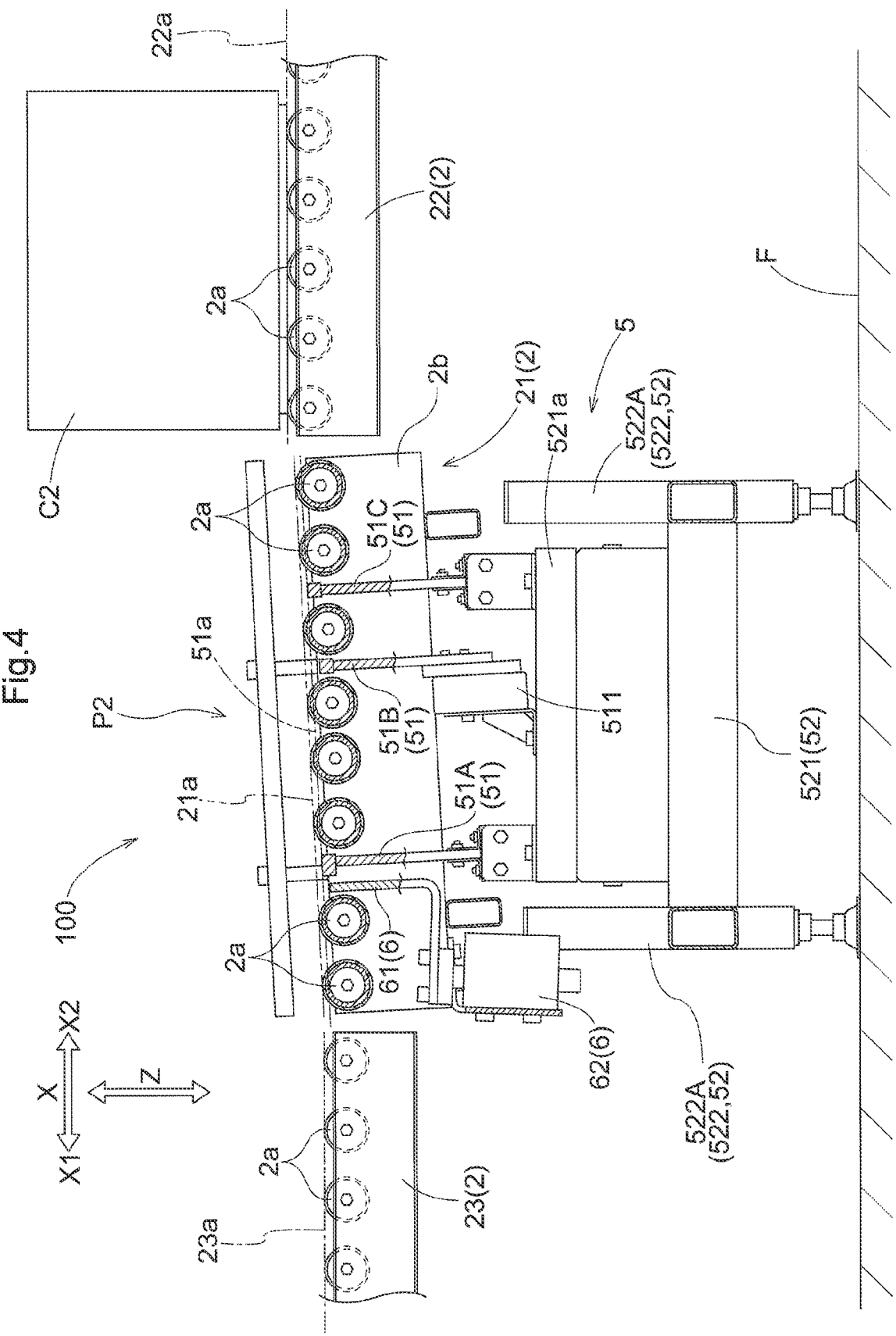

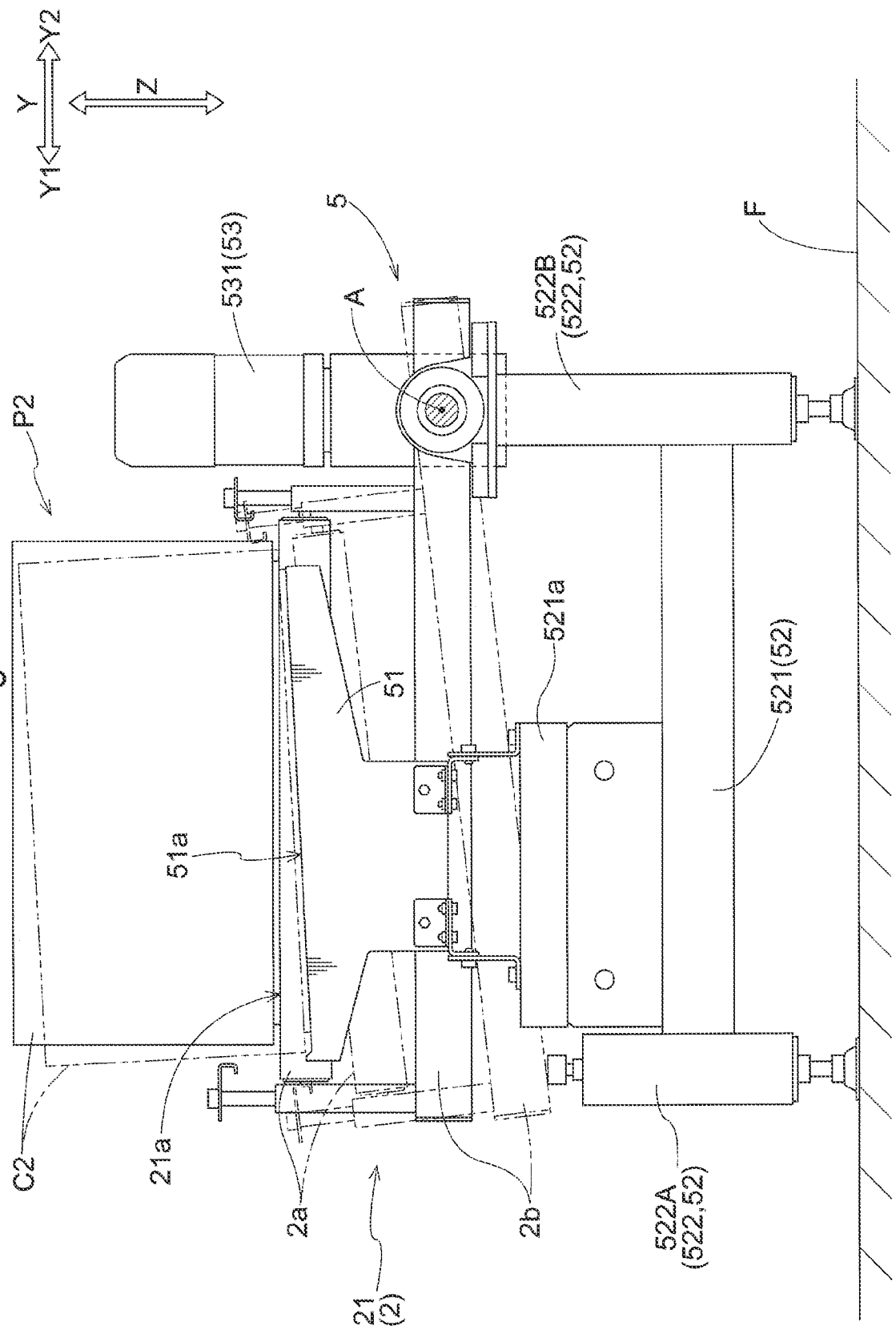

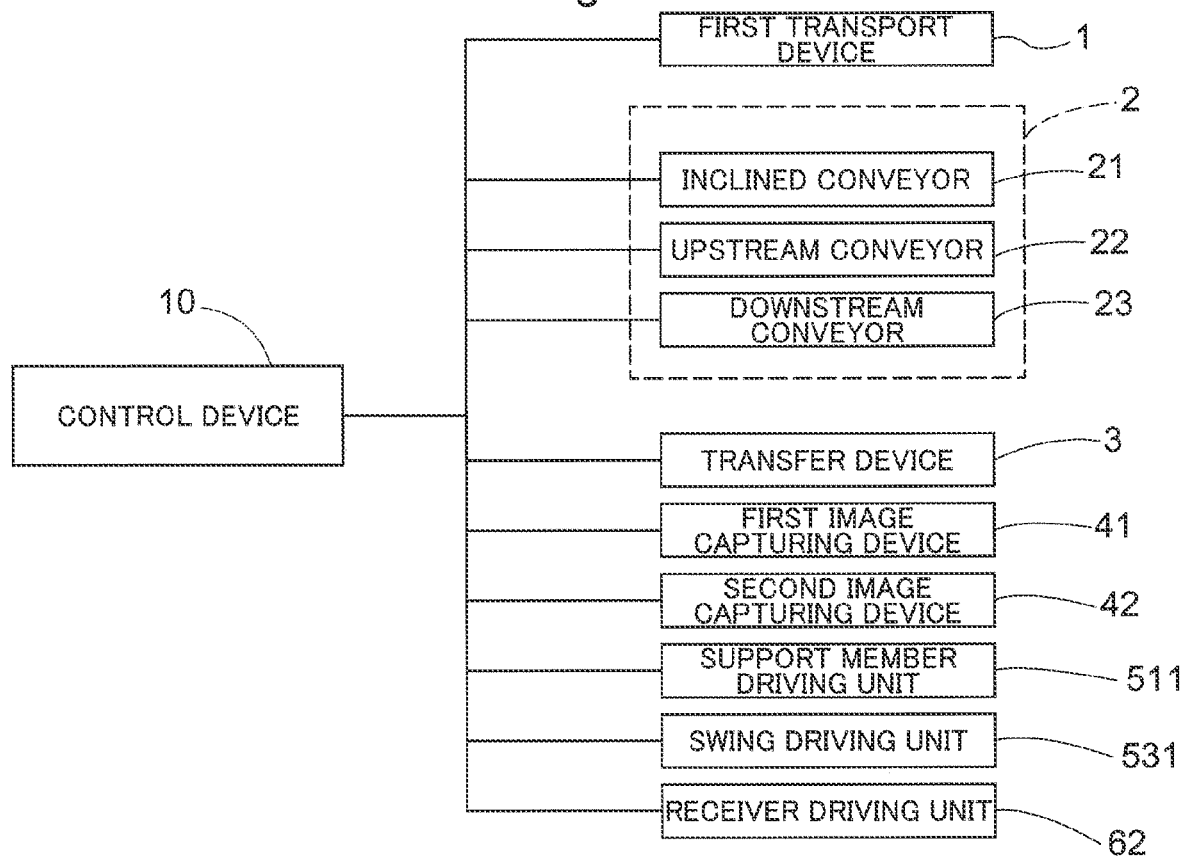
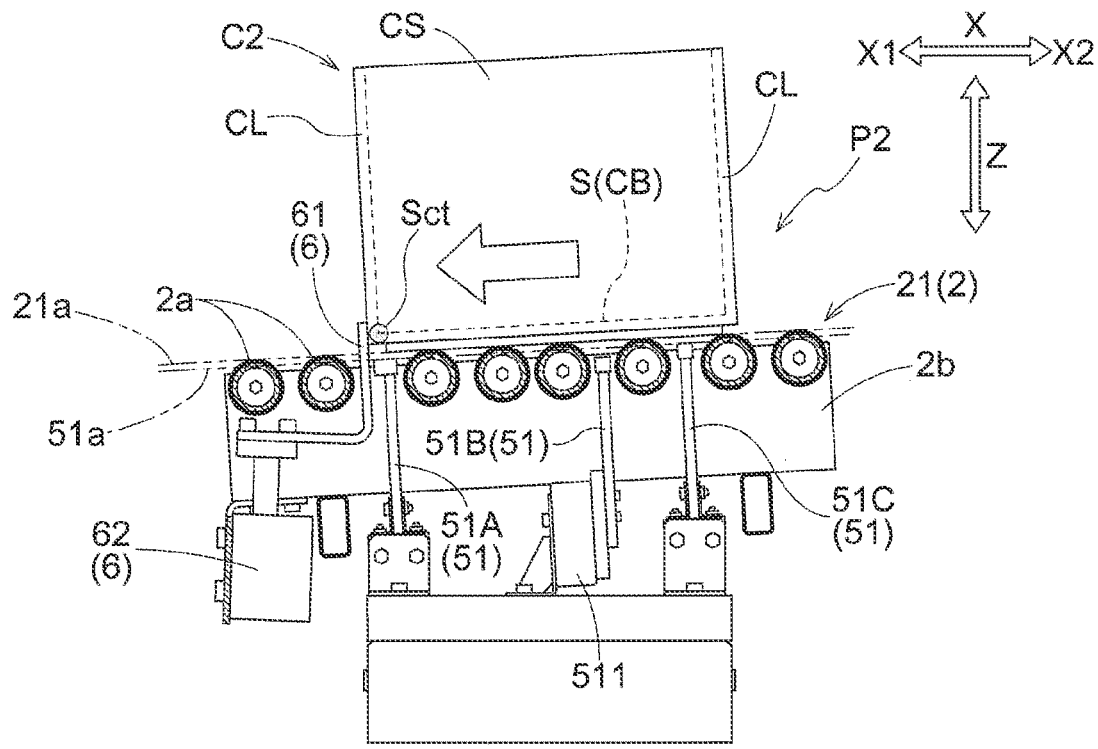

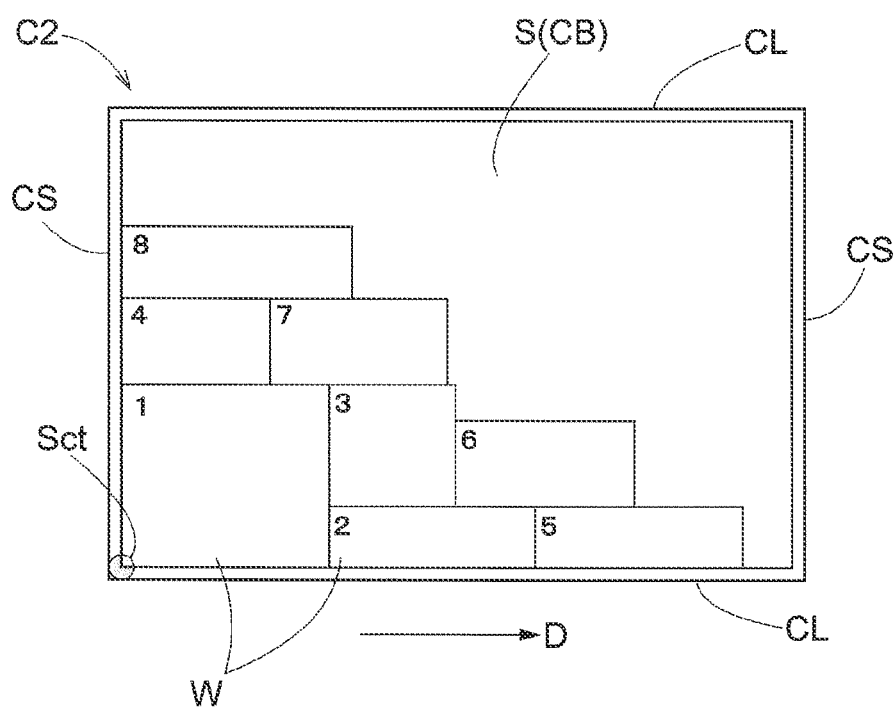

ARTICLE TRANSFER FACILITY

CROSS-REFERENCE TO RELATED APPLICATIONS

This application is the United States national phase of International Application No. PCT/JP2019/044371 filed Nov. 12, 2019, and claims priority to Japanese Patent Application No. 2018-213660 filed Nov. 14, 2018, the disclosures of which are hereby incorporated by reference in their entirety.

BACKGROUND OF THE INVENTION

1. Field of the Invention

The present invention relates to an article transfer facility that transfers articles.

2. Description of Related Art

An example of such an article transfer facility is disclosed in Patent Document 1 shown below. In the following description of background art, the names of the members and the reference numerals used in Patent Document 1 are quoted in parentheses.

Patent Document 1 discloses an article transfer article that is provided with a transfer device (transfer device 3) that transfers an article (article W) from a first support member (first container C1) and a second support member (second container C2). In the article transfer facility according to Patent Document 1, the transfer device takes out an article supported by the first support member from the first support member, and loads the article taken out from the first support member, onto the second support member.

In such an article transfer facility, for example, in a case where the loaded articles are in an unstable attitude such as a case where a plurality of articles are loaded onto the second support member in a stacked state, there is the possibility of the articles falling or collapsing. Also, articles are loaded on the second support member by the transfer device so that the articles do not interfere with each other, and therefore gaps are likely to be formed between the articles, and there is a limit in improving efficiency in storing the articles. As described above, the article transfer facility according to Patent Document 1 has room for improvement in terms of the stability of the attitude of the articles on the second support member and efficiency in storing articles.

Patent Document 1: JP 2018-104126A (FIG. 10)

SUMMARY OF THE INVENTION

Therefore, there is a demand for realization of an article transfer facility that can make it easier to ensure the stability of the attitude of the articles on the second support member, and improve efficiency in storing the articles when transferring articles from the first support member to the second support member.

A characteristic configuration of an article transfer facility in view of the above demand lies in an article transfer facility that transfers articles, including:
a transfer device that performs a first operation to take out the article that is supported by a first support member, from the first support member, and a second operation to load the article taken out from the first support member, onto a second support member; and
a support mechanism that supports the second support member at a predetermined position,
wherein the second support member has a rectangular mounting surface onto which the articles are to be mounted, and is formed in a box shape with an open upper surface, and
the support mechanism supports the second support member in an inclined state such that a target corner portion that is one of a plurality of corner portions of the mounting surface is located lower than the other corner portions.

With this characteristic configuration, the second support member supported by the support mechanism at the predetermined position is in an inclined orientation such that a target corner portion that is one of a plurality of corner portions of the mounting surface of the second support member is located lower than the other corner portions. Therefore, the bottom surface of the article stored in the second support member is supported by the mounting surface of the second support member or the upper surface of another article located below adjacent thereto, and also the side surface of the article on the target corner side is supported by the side wall portion of the second support member of the side surface of another article that is located laterally adjacent thereto. As a result, it is possible to stabilize the attitude of the articles loaded onto the second support member, and reduce the possibility of the articles falling or collapsing. Also, depending on the inclination angle and the degree of smoothness of the mounting surface, it is possible to transfer the articles loaded onto the second support member to the target corner portion side along the inclination of the mounting surface, and narrower a gap between articles that are adjacent to each other, or a gap between articles and the side wall portion. If this is the case, it is also possible to improve efficiency in storing articles on the second support member. As described above, with this configuration, it is possible to make it easier to ensure the stability of the attitude of articles on the second support member and improve efficiency in storing the articles.

BRIEF DESCRIPTION OF THE DRAWINGS

FIG. 4 is a side view of an inclined conveyor.
FIG. 5 is a front view of the inclined conveyor.
FIG. 6 is a control block diagram.
FIG. 7 is a side view showing how the inclined conveyor transports a second container.
FIG. 12 is a diagram showing how articles are loaded in a second container.

DETAILED DESCRIPTION OF PREFERRED EMBODIMENTS

The following describes an article transfer facility 100 according to an embodiment with reference to the drawings.

Figure 1:
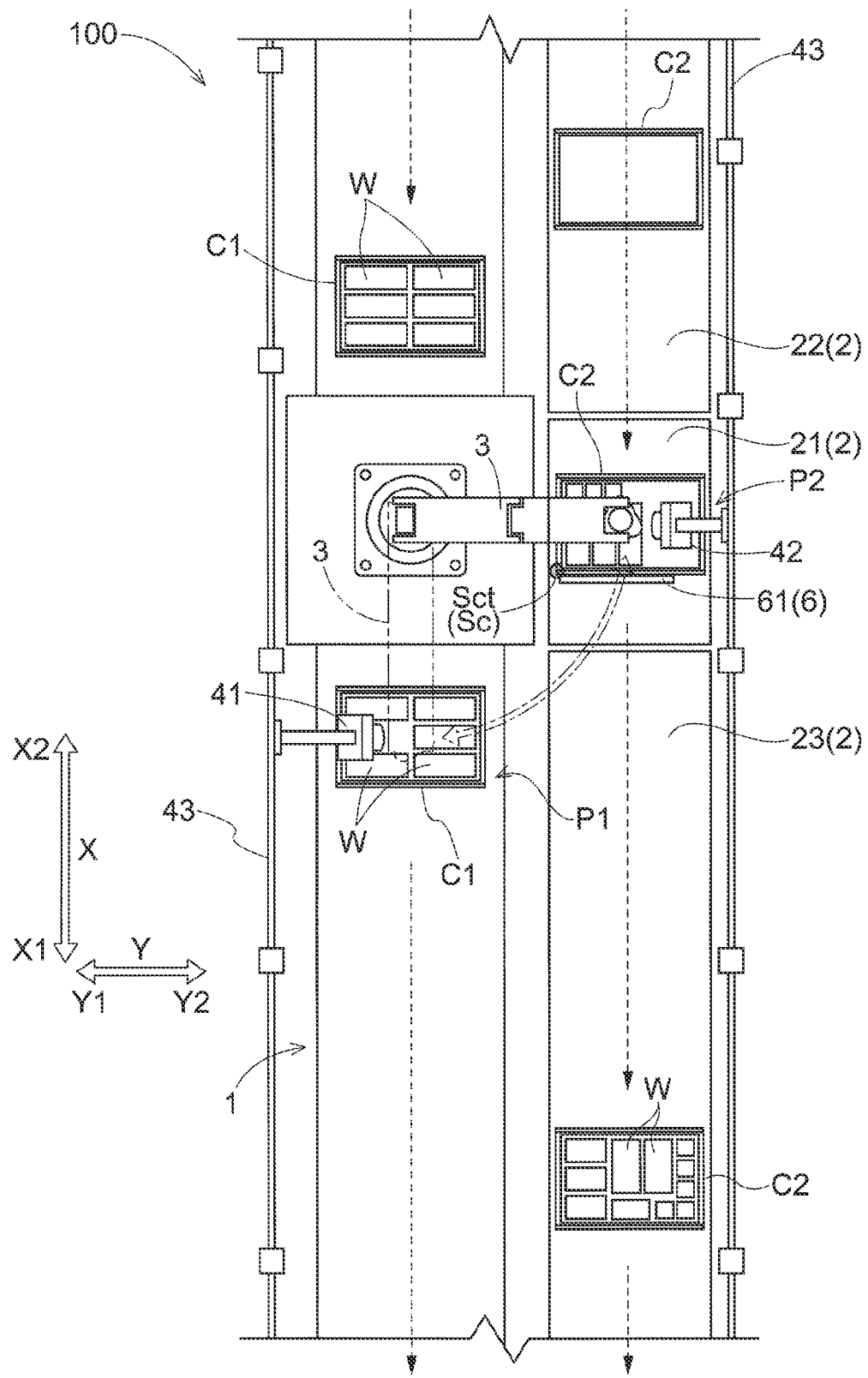
FIG. 1 is a plan view of an article transfer facility according to an embodiment.

As shown in FIG. 1, the article transfer facility 100 performs transfer work to transfer articles W from a first container C1 to a second container C2. The first container C1 and the second container C2 correspond to a "first support member" and a "second support member" each of which supports articles W, respectively.

Figure 2:
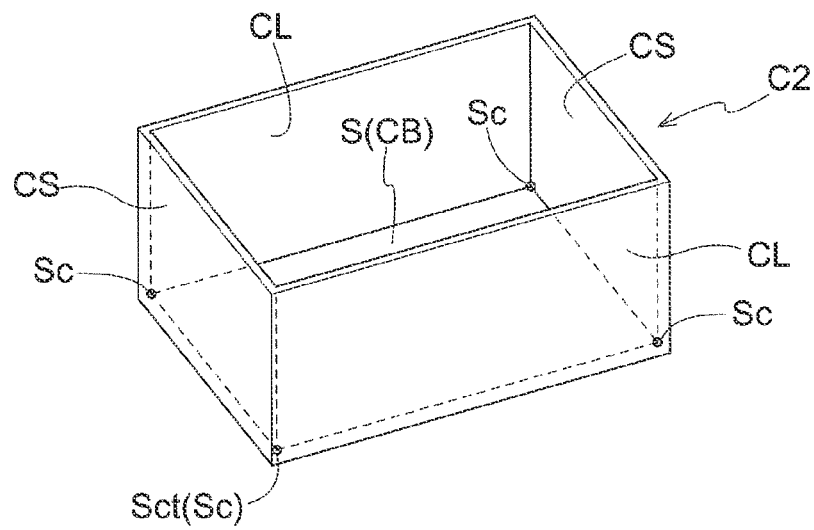
FIG. 2 is a perspective view of a second container.

As shown in FIG. 2, each of the second containers C2 has a bottom portion CB with a mounting surface S onto which articles W are to be placed, a pair of long-wall portions CL that respectively stand on a pair of long sides of the mounting surface S, and a pair of short-wall portions CS that respectively stand on a pair of short sides of the mounting surface S. As described above, each of the second containers C2 has a rectangular mounting surface S onto which articles W are to be mounted, and is formed in a box-shape with an open upper surface. In the present embodiment, each of the second containers C2 is formed in a rectangular parallelepiped shape with an open upper surface. In the present embodiment, each of the first containers C1 is also formed in a rectangular parallelepiped shape with an open upper surface. Each of the second containers C2 has four corner portions Sc that are located at the corners of the mounting surface S. Note that a "rectangle" may refer to an elongated rectangle and a square in the present application.

As shown in FIG. 1, in the present embodiment, the article transfer facility 100 includes a first transport device 1 that transports first containers C1 and a second transport device 2 that transports second containers C2.

In the following description, the direction in which the first containers C1 and the second containers C2 are transported is referred to as a "transport direction X", and a downstream side and an upstream side in the transport direction X are respectively referred to as a "downstream side X1" and an "upstream side X2". Furthermore, a direction that is orthogonal to the transport direction X when viewed in a vertical direction is referred to as a "transport width direction Y". Also, a vertical direction is referred to as a "top-bottom direction Z".

Figure 3:
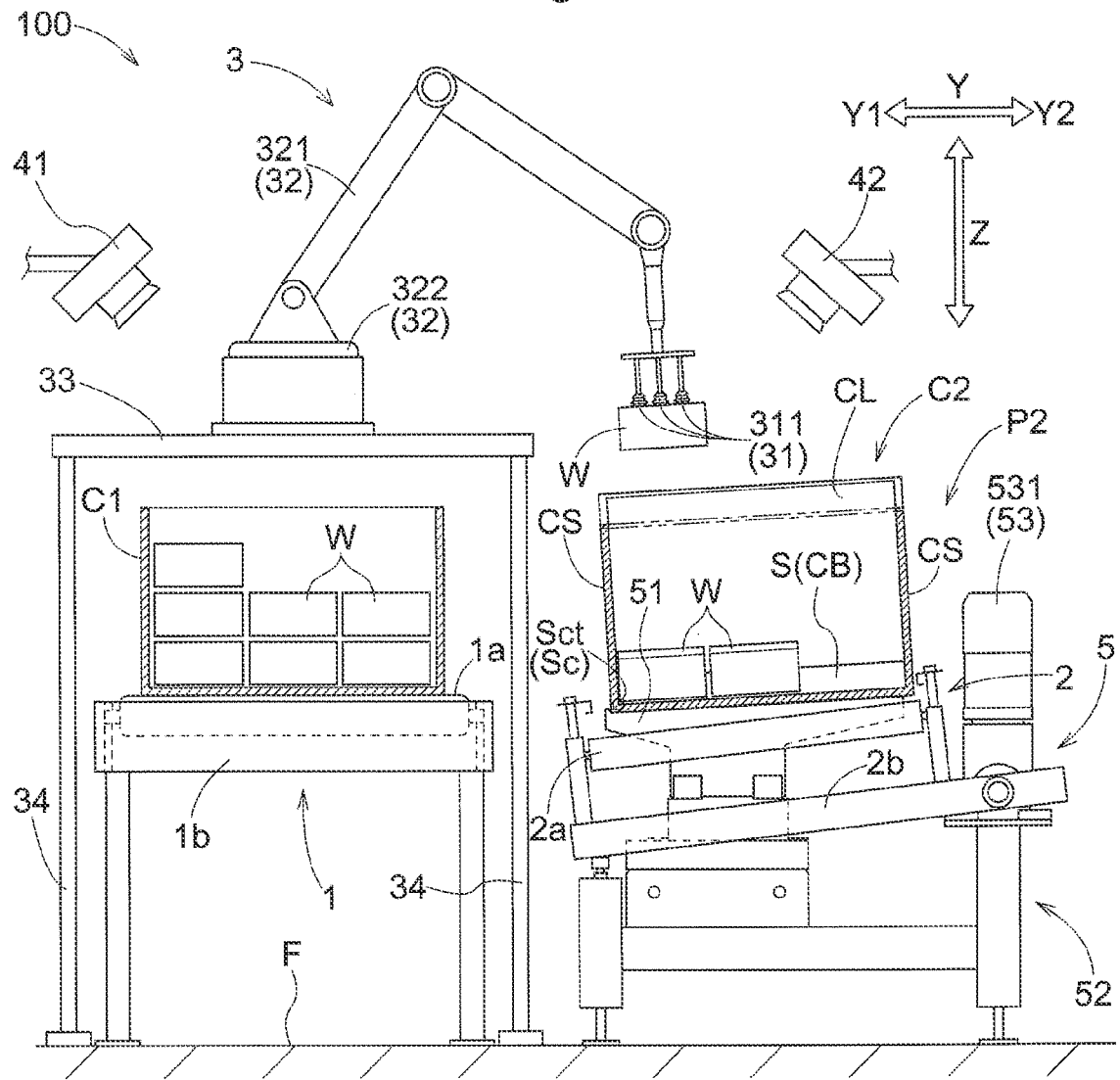
FIG. 3 is a front view of the article transfer facility according to the embodiment.

The first transport device 1 is a device that transports first containers C1 in the transport direction X. As shown in FIG. 3, in the present embodiment, the first transport device 1 is a roller conveyor that has a plurality of first rollers 1a. Each of the plurality of first rollers 1a has a rotation shaft that extends in the transport width direction Y. The plurality of first rollers 1a are arranged in the transport direction X such that the first rollers 1a that are adjacent to each other in the transport direction X are separate from each other. The plurality of first rollers 1a are supported by a first frame 1b so as to be rotatable.

As shown in FIG. 1, a first work position P1 is set in the transport path of the first transport device 1. The first transport device 1 transports a first container C1 from a first transport source that is located outside the figure, to the first work position P1. Thereafter, the first transport device 1 transports the first container C1 from the first work position P1 to a first transport destination that is located outside the figure. The first container C1 transported by the first transport device 1 to the first work position P1 stores one or more articles W. For example, one first container C1 stores a plurality of articles W of the same type.

In the present embodiment, the first transport device 1 transports each first container C1 such that the short sides of the mounting surface of the first container C1 are orientated in the transport direction X.

The second transport device 2 is a device that transports second containers C2 in the transport direction X. As shown in FIG. 3, in the present embodiment, the second transport device 2 is a roller conveyor that has a plurality of second rollers 2a. Each of the plurality of second rollers 2a has a rotation shaft that extends in the transport width direction Y. The plurality of second rollers 2a are arranged in the transport direction X such that the second rollers 2a that are adjacent to each other in the transport direction X are separate from each other. The plurality of second rollers 2a are supported by a second frame 2b so as to be rotatable.

In the present embodiment, the second transport device 2 is located adjacent to the first transport device 1 on one side in the transport width direction Y. Note that, in the following description, in the transport width direction Y, the first transport device 1 side with respect to the second transport device 2 is referred to as a "width direction first side Y1", and the opposite side is referred to as a "width direction second side Y2".

As shown in FIG. 1, a second work position P2 is set in the transport path of the second transport device 2. The second transport device 2 transports a second container C2 from a second transport source that is located outside the figure, to the second work position P2. Thereafter, the second transport device 2 transports the second container C2 from the second work position P2 to a second transport destination that is located outside the figure. The second container C2 transported by the second transport device 2 to the second work position P2 does not store an article W. However, the second container C2 transported from the second work position P2 stores one or more articles W of the same type or a plurality of articles W of a plurality of types, transferred from the first containers C1.

In the present embodiment, the second transport device 2 transports each second container C2 such that the short sides of the mounting surface S of the second container C2 are orientated in the transport direction X, i.e., such that the short-wall portions CS are orientated in the transport direction X.

In the present embodiment, the second transport device 2 includes an inclined conveyor 21, an upstream conveyor 22, and a downstream conveyor 23. The inclined conveyor 21 is located at the second work position P2. As shown in FIG. 4, an inclined transport surface 21a that is a transport surface of the inclined conveyor 21 is inclined so as to be inclined downward in a direction toward the downstream side X1.

The upstream conveyor 22 is located adjacent to the inclined conveyor 21 on the upstream side X2 so as to be able to pass first containers C1 to the inclined conveyor 21. The downstream conveyor 23 is located adjacent to the inclined conveyor 21 on the downstream side X1 so as to be able to receive first containers C1 from the inclined conveyor 21. An upstream transport surface 22a that is a transport surface of the upstream conveyor 22, and a downstream transport surface 23a that is a transport surface of the downstream conveyor 23 are located along a horizontal plane. The upstream transport surface 22a is located at a higher position than the downstream transport surface 23a.

As shown in FIGS. 1 and 3, the article transfer facility 100 includes a transfer device 3 that transfers an article W from a first container C1 to a second container C2. The transfer device 3 transfers an article W that is stored in the first container C1 located at the first work position P1 to the second container C2 located at the second work position P2. That is to say, the transfer device 3 performs a first operation to take out an article W that is supported by a first container C1, from the first container C1, and a second operation to load the article W taken out from the first container C1, onto a second container C2.

As shown in FIG. 3, the transfer device 3 includes a holding unit 31 that holds an article W and a movement mechanism 32 that moves the holding unit 31.

The holding unit 31 has a plurality of (three in this example) suction pads 311. The suction pads 311 are configured to be able to switch between a suction state in which the suction pads 311 act on a suction target (an article W), and a non-suction state in which the suction pads 311 do not act on a suction target. The suction pads 311 suck a suction target by generating negative pressure in the space between the suction pads 311 and the suction target in a state of being in contact with the suction target. In the present embodiment, the holding unit 31 holds an article W by causing one or more or all of the plurality of suction pads 311 to suck the upper surface of the article W.

The movement mechanism 32 includes an articulated arm 321 that is configured to be bendable and extendable, and a rotation unit 322 that rotates the articulated arm 321 about a rotation shaft that extends in the top-bottom direction Z. The movement mechanism 32 changes the position and the orientation of the holding unit 31 by bending and extending the articulated arm 321 as well as rotating the articulated arm 321 using the rotation unit 322.

In the present embodiment, the transfer device 3 is mounted on a mounting platform 33. The mounting platform 33 is located higher than the first transport device 1 so as to cover a portion of the first transport device 1 when viewed in the top-bottom direction Z. The mounting platform 33 extends in the top-bottom direction Z, and is supported by a plurality of legs 34 that are installed on a floor surface F. The plurality of legs 34 are located so as not to interfere with the first transport device 1. As described above, in the present embodiment, the transfer device 3 is located adjacent to the inclined conveyor 21 of the second transport device 2, on the width direction first side Y1. Note that, in the present embodiment, the first work position P1 is set on the downstream side X1 of the mounting platform 33 when viewed in the top-bottom direction Z (see FIG. 1).

As shown in FIGS. 1 and 3, in the present embodiment, the article transfer facility 100 includes a first image capturing device 41 that captures an image of the inside of the first container C1 located at the first work position P1, and a second image capturing device 42 that captures an image of the inside of the second container C2 located at the second work position P2. The first image capturing device 41 captures an image of the inside of the first container C1 located at the first work position P1 while the transfer device 3 is performing the first operation. The second image capturing device 42 captures an image of the inside of the second container C2 located at the second work position P2 while the transfer device 3 is performing the second operation. In the present embodiment, the first image capturing device 41 and the second image capturing device 42 are fixed to a fence member 43 that surrounds an installation area in which the first transport device 1, the second transport device 2, and the transfer device 3 are installed.

As shown in FIGS. 4 and 5, in the present embodiment, the article transfer facility 100 includes an inclination device 5 that inclines a second container C2 at the second work position P2. The inclination device 5 functions as a "support mechanism" that supports a second container C2 at a predetermined position. In the present embodiment, the second work position P2 corresponds to the "predetermined position". The inclination device 5 includes a plurality of support members 51 that support second containers C2, a base 52 that supports the plurality of support members 51 and the inclined conveyor 21, and a swing unit 53 that swings the inclined conveyor 21 relative to the plurality of support members 51.

The plurality of support members 51 are lined up in the transport direction X. Each of the plurality of support members 51 is formed in a plate shape that extends in the transport width direction Y and the top-bottom direction Z. Each of the plurality of support members 51 is located between second rollers 2a that are adjacent to each other in the transport direction X of the inclined conveyor 21. In the present embodiment, the plurality of support members 51 include a first support member 51A, a second support member 51B that is located on the upstream side X2 of the first support member 51A, and a third support member 51C that is located on the upstream side X2 of the second support member 51B.

As shown in FIGS. 4 and 5, a support surface 51a that is an imaginary surface that connects the upper end surfaces of the plurality of support members 51 is gradually lowered in a direction toward the downstream side X1, and inclined downward in a direction toward the width direction first side Y1. Therefore, when a second container C2 is supported by the plurality of support members 51, one of the four corner portions Sc of the second container C2 is located lower than the other corner portions Sc. Here, when a second container C2 is supported by a plurality of support members 51, one corner portion Sc of the four corner portions Sc that is located lower than the other corner portions Sc is referred to as a target corner portion Sct (see FIGS. 2 and 3). In the present embodiment, the inclination angle in the transport direction X and the inclination angle in the transport width direction Y of the support surface 51a are the same.

As described above, in the present embodiment, the transfer device 3 is located adjacent to the inclined conveyor 21 of the second transport device 2, on the width direction first side Y1. Therefore, in the present embodiment, the second container C2 supported by the plurality of support members 51 is inclined such that the mounting surface S thereof is inclined downward in a direction toward the transfer device 3.

One or more support members 51 of the plurality of support members 51, other than the support members 51 located at the two ends in the transport direction X, are configured so as to be able to retract such that the upper end surfaces thereof are located lower than the support surface 51a. In the present embodiment, the second support member 51B can be moved by a support member driving unit 511 in the top-bottom direction Z. The support member driving unit 511 includes an electric motor and an interlocking mechanism for interlocking the rotation shaft of the electric motor with the second support member 51B. The support member driving unit 511 switches the second support member 51B to a support position at which the upper end surface of the second support member 51B is in the same plane as the support surface 51a, and a support retraction position at which the upper end surface of the second support member 51B is located lower than the support surface 51a, by driving the electric motor to move the second support member 51B in the top-bottom direction Z via the interlocking mechanism.

The base 52 includes a base platform 521 and a plurality of support pillars 522 that support the base platform 521. The base platform 521 supports the plurality of support members 51 via a support platform 521a that is mounted on the base platform 521. In the present embodiment, the first support member 51A, the third support member 51C, and the support member driving unit 511 are fixed to the support platform 521a, and the support platform 521a is mounted on the base platform 521.

The plurality of support pillars 522 extend in the top-bottom direction Z, and are installed on the floor surface F. In the present embodiment, the plurality of support pillars 522 include a pair of first support pillars 522A, and second support pillars 522B that are separate from the pair of first support pillars 522A in a direction toward the width direction second side Y2. The pair of first support pillars 522A are arranged with an interval therebetween in the transport direction X. The pair of second support pillars 522B are arranged with an interval therebetween in the transport direction X so as to be aligned with the pair of first support pillars 522A in the transport direction X. The pair of second support pillars 522B are located on the width direction second side Y2 of the inclined conveyor 21. The pair of second support pillars 522B support the second frame 2b that supports the plurality of second rollers 2a of the second transport device 2 so as to be swingable about an axis A that extends in the transport direction X.

As shown in FIG. 5, the swing unit 53 includes a swing driving unit 531 that swings the second frame 2b about the axis A. The swing driving unit 531 includes an electric motor, and swings the second frame 2b about the axis A by driving the electric motor. As the second frame 2b swings, the inclination angle of the inclined transport surface 21a, which is constituted by the plurality of second rollers 2a supported by the second frame 2b, changes relative to the transport width direction Y. In the present embodiment, the inclination angle of the inclined transport surface 21a relative to the transport width direction Y can be changed between the angle with which the inclined transport surface 21a is parallel to the transport width direction Y and is located higher than the support surface 51a (see the solid line in FIG. 5) and the angle with which the inclined transport surface 21a is inclined relative to the transport width direction Y and is located lower than the support surface 51a (see the two-dot chain line in FIG. 4).

As described above, the swing unit 53 swings the inclined conveyor 21 downward relative to the plurality of supporting members 51, and accordingly the plurality of support members 51 come into a protruding state in which the upper ends thereof protrude to upward of the inclined transport surface 21a of the inclined conveyor 21. As described above, the swing unit 53 swings the inclined conveyor 21 upward relative to the plurality of supporting members 51, and accordingly the plurality of support members 51 comes into a retracted state in which the upper ends thereof are retracted downward of the inclined transport surface 21a of the inclined conveyor 21.

In the retracted state, the second container C2 is only supported by the inclined transport surface 21a, of the inclined transport surface 21a and the support surface 51a. In the present embodiment, at a point in time in the process of changing from such a retracted state to the protruding state and from the protruding state to the retracted state, the inclined transport surface 21a and the support surface 51a come into state in which they are located in the same plane, and the second container C2 comes into a state in which it is supported by both the inclined transport surface 21a and the support surface 51a. Thus, it is possible to suppress vibrations of the second container C2 generated in the process of state change. In the protruding state, the second container C2 is only supported by the support surface 51a, of the inclined transport surface 21a and the support surface 51a. As described above, when a second container C2 is supported by the support surface 51a, the second containers C2 is inclined such that the target corner portion Sct, which is one of the plurality of corner portions Sc of the second containers C2, is located lower than the other corner portions Sc.

As shown in FIG. 4, in the present embodiment, the article transfer facility 100 includes a receiving device 6 that receives a second container C2 that has been transported to the second work position P2. The receiving device 6 includes a receiver 61 that abuts against a second container C2 and receives the second container C2, and a receiver driving unit 62 that moves the receiver 61 in the top-bottom direction Z. The receiving device 6 moves the receiver 61 in the top-bottom direction Z using the receiver driving unit 62 to switch the position of the receiver 61 to a receive retraction position at which the upper end of the receiver 61 is located lower than the inclined transport surface 21a, and to a receiving position at which the upper end of the receiver 61 is located higher than the inclined transport surface 21a. The receiver 61 is located such that the upper end of the receiver 61 is located on the downstream side X1 of the support member 51 that is located most downstream in a direction toward the downstream side X1 (the first support member 51A in the present embodiment). In the present embodiment, the receiver 61, when viewed in the transport width direction Y, extends toward the upstream side X2 from a portion connected to the receiver driving unit 62 and further extends upward, so as to have an L shape.

As shown in FIG. 6, the article transfer facility 100 includes a control device 10. The control device 10 is configured to be able to control the first transport device 1, the second transport device 2, the transfer device 3, the first image capturing device 41, the second image capturing device 42, the support member driving unit 511, the swing driving unit 531, and the receiver driving unit 62.

The following describes a mode of control that is performed by the control device 10. As shown in FIG. 7, the control device 10 causes the swing driving unit 531 to swing the inclined conveyor 21 so that the plurality of support members 51 come into a retracted state, and causes the receiver driving unit 62 to move the receiver 61 to the receiving position. In this state, the control device 10 drives and rotates the plurality of second rollers 2a of the second transport device 2 to transport the second container C2 to the second work position P2.

In the present embodiment, the control device 10 stops the rotation of the plurality of second rollers 2a upon the elapse of a preset period of time after the second container C2 has reached the second work position P2. In this way, the second transport device 2 continuously performs the transport operation for the preset period of time after the second container C2 has been transported to the second work position P2. As a result, the second container C2 is pressed against the receiver 61, and therefore, even if the second container C2 is transported to the second work position P2 in an inclined state relative to a predetermined orientation when viewed in the top-bottom direction Z, the orientation of the second container C2 can be corrected to the predetermined orientation.

Also, as with the control performed on the second transport device 2, the control device 10 drives and rotates the plurality of first rollers 1a of the first transport device 1 to transport the first container C1 to the first work position P1.

Figure 8:
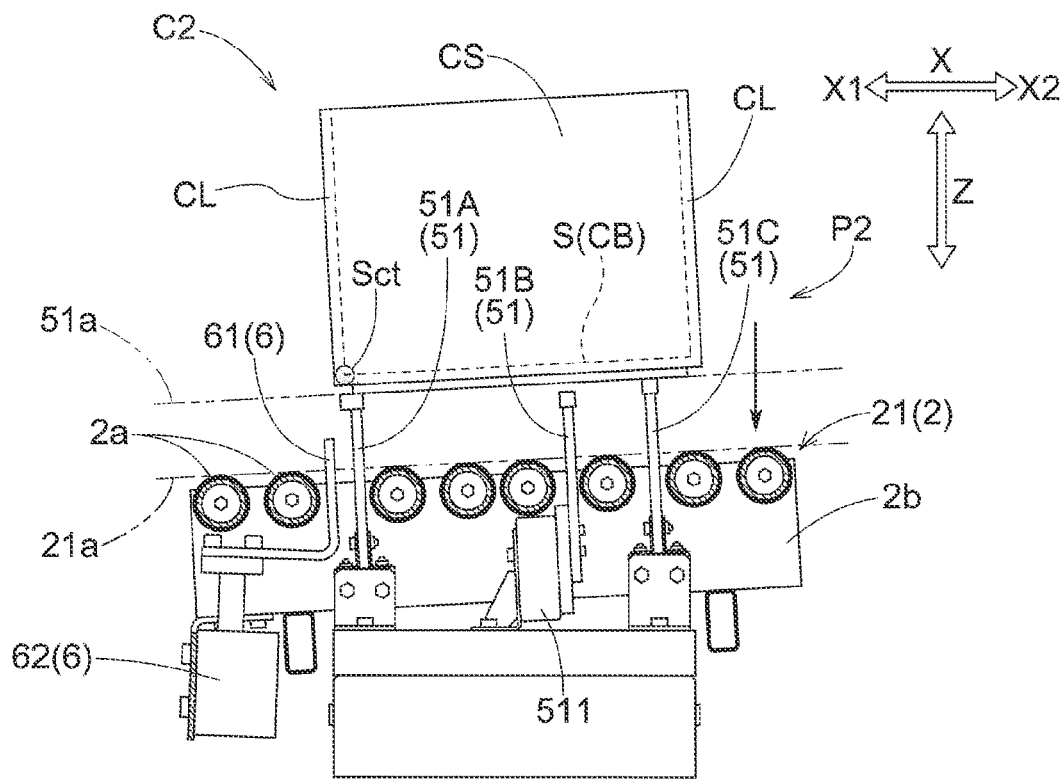
FIG. 8 is a side view showing how a plurality of support members support a large-sized second container.

Next, as shown in FIG. 8, the control device 10 controls the swing driving unit 531 to swing the inclined conveyor 21 downward relative to the plurality of support members 51 so that the plurality of support members 51 are switched from the retracted state to the protruding state.

At this time, as shown in FIG. 8, if the size of the second container C2 is relatively large and the end of the bottom surface of the second container C2 on the upstream side X2 is located on the upstream side X2 of the upper end surface of the third support member 51C, the control device 10 causes the support member driving unit 511 to move the second support member 51B to the support retraction position. As a result, the second container C2 is supported by the first support member 51A and the third support member 51C in an inclined state in which the target corner portion Sct is located lower than the other corner portions Sc.

Figure 9:
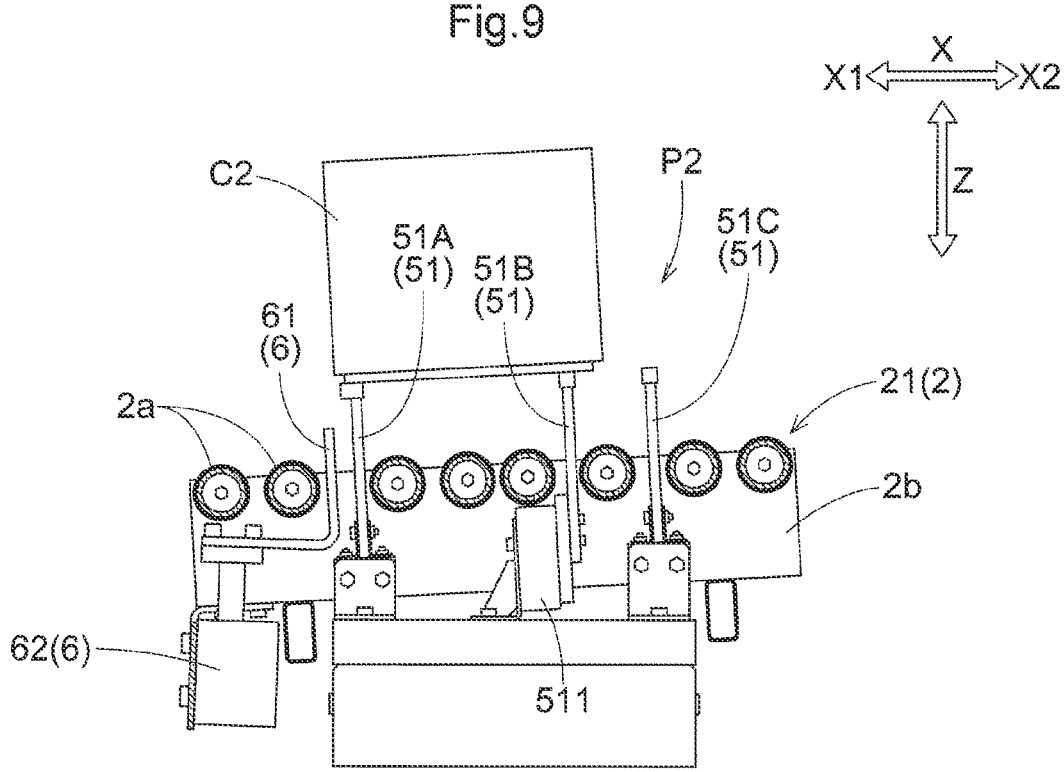
FIG. 9 is a side view showing how a plurality of support members support a small-sized second container.

Also, as shown in FIG. 9, if the size of the second container C2 is relatively small and the end of the bottom surface of the second container C2 on the upstream side X2 is located between the upper end surface of the second support member 51B and the upper end surface of the third support member 51C in the transport direction X, the control device 10 causes the support member driving unit 511 to move the second support member 51B to the support position. As a result, the second container C2 is supported by the first support member 51A and the second support member 51B in an inclined state in which the target corner portion Sct is located lower than the other corner portions Sc.

Next, the control device 10 causes the first image capturing device 41 to capture an image of the inside of the first container C1 and causes the second image capturing device 42 to capture an image of the inside of the second container C2. Thereafter, the control device 10 causes the transfer device 3 to perform the first operation and the second operation based on the pieces of image data captured by the first image capturing device 41 and the second image capturing device 42.

In the present embodiment, the transfer device 3 is controlled by the control device 10 so as to perform the first operation according to a first coordinate system and perform the second operation according to a second coordinate system that is different from the first coordinate system. The second coordinate system is inclined relative to a horizontal plane according to the inclination of the second container C2 supported by the plurality of support members 51. In this example, the first coordinate system is a three-dimensional Cartesian coordinate system with an x-axis that is parallel to the transport direction X, a y-axis that is parallel to the transport width direction Y, and a z-axis that is parallel to the top-bottom direction Z. Also, in the present embodiment, the second coordinate system is a three-dimensional Cartesian coordinate system with an x-axis that is parallel to the short sides of the mounting surface S of the second container C2 supported by the plurality of support members 51, a y-axis that is parallel to the long sides of the mounting surface S of the second container C2 supported by the plurality of support members 51, and a z-axis that is orthogonal to the mounting surface S of the second container C2 supported by the plurality of support members 51.

Also, in the present embodiment, when the transfer device 3 is to perform the second operation, the transfer device 3 is controlled by the control device 10 so that the transfer device 3 sequentially arranges articles W in a reference direction D, which is a direction along one of the four sides of the mounting surface S, with reference to the target corner portion Sct that serves as the reference point.

Figure 10:
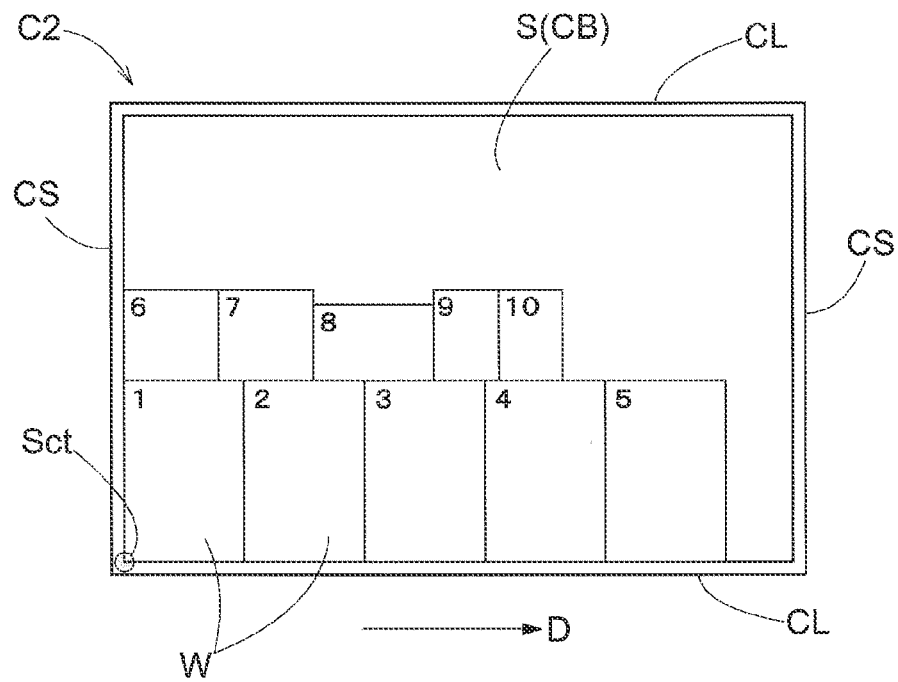
FIG. 10 is a diagram showing how articles are loaded in a second container.

For example, as shown in FIG. 10, when the direction along the long sides of the mounting surface S is the reference direction D, articles W are sequentially mounted along the long-wall portions CL so as to be adjacent to the long-wall portions CL with reference to the target corner portion Sct that serves as the reference point. When there is no space in which an article W can be mounted so as to be adjacent to the long-wall portions CL, articles are sequentially mounted along the reference direction D from the side closer to the target corner portion Sct, in the reference direction D so that the articles W are adjacent to the articles W adjacent to the long-wall portions CL, in a direction orthogonal to the reference direction D. When articles W are to be loaded in a stacked state in which the plurality of articles W are stacked in a plurality of tiers in the top-bottom direction Z, after articles W have been loaded in one tier, articles W are sequentially mounted onto the upper surface of the articles in this lower tier, along the long-wall portions CL so as to be adjacent to the long-wall portions CL with reference to the target corner portion Sct again. Such work is repeated until all of the articles W to be stored in the second container C2 have been stored. Note that, in FIG. 10, the numbers respectively added to the upper left positions of the articles W indicate the order in which the articles W are loaded, and the same applies to FIGS. 11 and 12.

Figure 11:
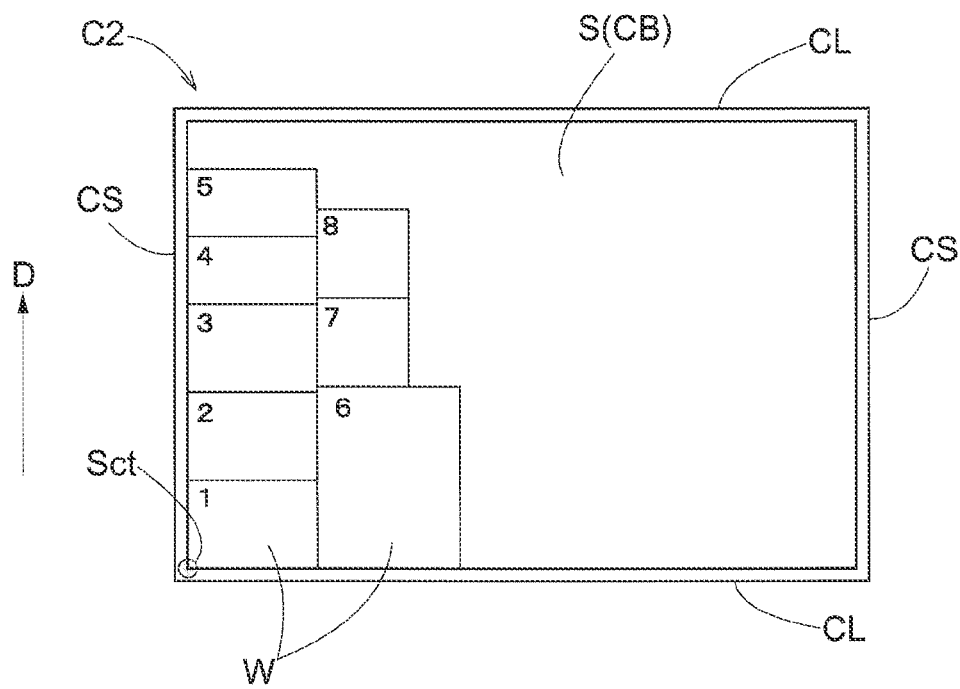
FIG. 11 is a diagram showing how articles are loaded in a second container.

Also, as shown in FIG. 11, when the direction along the short sides of the mounting surface S is the reference direction D, articles W are sequentially mounted along the short-wall portions CS so as to be adjacent to the short-wall portions CS with reference to the target corner portion Sct that serves as the reference point. When there is no space in which articles W can be mounted so as to be adjacent to the short-wall portions CS, articles are sequentially mounted along the reference direction D from the side closer to the target corner portion Sct, in the reference direction D so that the articles W are adjacent to the articles W adjacent to the short-wall portions CS, in a direction orthogonal to the reference direction D. When articles W are to be loaded in a stacked state, after articles W have been loaded in one tier, articles W are sequentially mounted onto the upper surface of the articles in this lower tier, along the short-wall portions CS so as to be adjacent to the short-wall portions CS with reference to the target corner portion Sct again. Such work is repeated until all of the articles W to be stored in the second container C2 have been stored.

Note that, during the above-described work, after a required number of articles W have been taken out from a first container C1, the control device 10 transports the first container C1 from the first work position P1 toward the downstream side X1, and also transports another first containers C1 in which other articles W are stored, to the first work position P1.

After all of the articles W to be stored in the second containers C2 have been stored, the control device 10 causes the swing driving unit 531 to swing the inclined conveyor 21 so that the plurality of support member 51 come into a retracted state, and causes the receiver driving unit 62 to move the receiver 61 to the receive retraction position. Thereafter, the control device 10 drives and rotates the plurality of second rollers 2a of the second transport device 2 to transport the second container C2 from the second work position P2 toward the downstream side X1, and also transports another empty second container C2 to the second work position P2.

Other Embodiments (1) The above embodiment describes, as an example, a configuration with which the transfer device 3 performs the second operation so as to sequentially arrange articles W in the reference direction D, which is a direction along one of the four sides of the mounting surface S, with reference to the target corner portion Sct that serves as the reference point. However, the present invention is not limited to such a configuration. For example, as shown in FIG. 12, it is possible to employ a configuration with which the transfer device 3 performs the second operation so as to arrange articles W in a fan shape when viewed in a direction that is orthogonal to the mounting surface S, with reference to the target corner portion Sct that serves as the reference point. It is also possible to employ a configuration with which the transfer device 3 performs the second operation by combining an operation for arranging articles W in the reference direction D and an operation for arranging articles W in a direction that is orthogonal to the reference direction D, or a configuration with which the transfer device 3 performs the second operation with reference to a location other than the target corner portion Sct.

(2) The above embodiment describes, as an example, a configuration with which the inclination device 5 functions as a "support mechanism" that supports a second container C2 at a predetermined position. However, the present invention is not limited to such a configuration, and, for example, it is possible to employ a configuration with which the second transport device 2 functions as the "support mechanism". Specifically, it is possible to employ a configuration with which the plurality of second rollers 2a of the second transport device 2 are arranged so as to support a second container C2 at the second work position P2 such that the target corner portion Sct is located lower than the other corner portions Sc.

(3) The above embodiment describes, as an example, a configuration with which each of the first containers C1 is formed in a box shape with an open upper surface. However, the present invention is not limited to such a configuration, and the first containers C1 may be pallets, skids, or the like.

(4) The above embodiment describes, as an example, a configuration that includes the first transport device 1 and the second transport device 2. However, the present invention is not limited to such a configuration, and it is possible to employ a configuration that includes either the first transport device 1 or the second transport device 2, or a configuration that includes neither of them. With such a configuration, for example, an operator may supply a first container C1 or a second container C2 to the first work position P1 or the second work position P2.

(5) The above embodiment describes, as an example, a configuration with which the transfer device 3 performs the first operation according to the first coordinate system and performs the second operation according to the second coordinate system that is different from the first coordinate system and is inclined relative to a horizontal plane according to the inclination of the second container C2 supported by the plurality of support members 51. However, the present invention is not limited to such a configuration, and either one or both of the first operation and the second operation may be performed according to a coordinate system different from that in the above-described embodiment. For example, it is possible to employ a configuration with which the transfer device 3 performs the first operation and the second operation according to the same coordinate system. In such a case, the coordinate system may have two axes that are parallel to a horizontal plane, or axes that are inclined relative to a horizontal plane. Alternatively, it is possible to employ a configuration with which the transfer device 3 performs the first operation according to the first coordinate system that is inclined relative to a horizontal plane according to the inclination of the second container C2 supported by the plurality of support members 51, and performs the second operation according to the second coordinate system that is not inclined relative to the horizontal surface.

(6) The above embodiment describes, as an example, a configuration with which the plurality of support members 51 support a second container C2 in an inclined state such that the mounting surface S is inclined downward in a direction toward the transfer device 3. However, the present invention is not limited to such a configuration, and, for example, it is possible to employ a configuration with which the plurality of support members 51 support a second container C2 in an inclined state such that the mounting surface S is inclined downward in a direction away from the transfer device 3.

(7) Note that the configurations disclosed in the above-described embodiments may be applied in combination with a configuration disclosed in another embodiment as long as no contradiction occurs. With respect to other configurations, the embodiments disclosed in the present description are mere examples in all respects. Therefore, various modifications can be made when necessary without departing from the spirit of the present disclosure.

Outline of the Above-Described Embodiments:

The following describes an outline of the above-described article transfer facility.

An article transfer facility is an article transfer facility that transfers articles, including:

a transfer device that performs a first operation to take out the article that is supported by a first support member, from the first support member, and a second operation to load the article taken out from the first support member, onto a second support member; and a support mechanism that supports the second support member at a predetermined position, wherein the second support member has a rectangular mounting surface onto which the articles are to be mounted, and is formed in a box shape with an open upper surface, and the support mechanism supports the second support member in an inclined state such that a target corner portion that is one of a plurality of corner portions of the mounting surface is located lower than the other corner portions.

With this configuration, the second support member supported by the support mechanism at the predetermined position is in an inclined state such that a target corner portion that is one of a plurality of corner portions of the mounting surface of the second support member is located lower than the other corner portions. Therefore, the bottom surface of the article stored in the second support member is supported by the mounting surface of the second support member or the upper surface of another article located below adjacent thereto, and also the side surface of the article on the target corner side is supported by the side wall portion of the second support member of the side surface of another article that is located laterally adjacent thereto. As a result, it is possible to stabilize the attitude of the articles loaded onto the second support member, and reduce the possibility of the articles falling or collapsing. Also, depending on the inclination angle and the degree of smoothness of the mounting surface, it is possible to transfer the articles loaded onto the second support member to the target corner portion side along the inclination of the mounting surface, and narrower a gap between articles that are adjacent to each other, or a gap between articles and the side wall portion. If this is the case, it is also possible to improve efficiency in storing articles in the second support member. As described above, with this configuration, it is possible to make it easier to ensure the stability of the attitude of articles on the second support member and improve efficiency in storing the articles.

Here, it is preferable that the transfer device performs the first operation according to a first coordinate system, and performs the second operation according to a second coordinate system that is different from the first coordinate system, and the second coordinate system is inclined relative to a horizontal plane according to an inclination of the second support member supported by the support mechanism.

With this configuration, it is possible to appropriately perform the second operation to load articles onto the second support member supported by the support mechanism in an inclined orientation. Therefore, it is possible to make it even easier to ensure the stability of the attitude of articles on the second support member.

It is also preferable that the transfer device performs the second operation on the plurality of articles so as to arrange the articles in a reference direction that is a direction along one of four sides of the mounting surface, with reference to the target corner portion that serves as a reference point.

With this configuration, it is possible to load articles along the side wall portion of the second support member from the target corner portion. Therefore, it is possible to further improve the stability of the attitude of articles on the second support member, using the side wall portion of the second support member.

It is also preferable that the support mechanism supports the second support member in an inclined state such that the mounting surface is inclined downward in a direction toward the transfer device.

With this configuration, the second support member is inclined such that the opening of the second support member approaches the transfer device. Therefore, with this configuration, it is easier to shorten the moving distance in the movement trajectory of articles when the transfer device loads articles onto the second support member through the opening of the second support member. Therefore, the transfer device can efficiently perform the second operation.

It is also preferable that the article transfer facility further includes:

a transport device that transports the second support member, wherein the support mechanism is located at the predetermined position on a transport path of the transport device.

With this configuration, it is possible to automatically supply the second support member to the predetermined position at which the support mechanism is located, and automatically carry out the second support member after articles have been transferred. Therefore, it is possible to efficiently transfers articles to the second support member.

INDUSTRIAL APPLICABILITY

The technology according to the present disclosure is applicable to an article transfer facility that transfers articles.

DESCRIPTION OF REFERENCE SIGNS

100 Article Transfer Facility
1 First Transport Device
2 Second Transport Device
3 Transfer Device
5 Inclination Device (Support Mechanism)
51 Support Member
W Article
C1 First Container (First Support Member)
C2 Second Container (Second Support Member)
S Mounting Surface
Sc Corner Portion
Sct Target Corner Portion
P1 First Work Position
P2 Second Work Position (Predetermined Position)

The invention claimed is:

1. An article transfer facility that transfers articles, comprising:

a transfer device that performs a first operation to take out an article that is supported by a first support member from the first support member, and a second operation to load the article taken out from the first support member onto a second support member;

a support mechanism that supports the second support member at a predetermined position; and a transport device that transports the second support member at the predetermined position, wherein the second support member has a rectangular mounting surface onto which the articles are to be mounted, and is formed in a box shape with an open upper surface, wherein the support mechanism supports the second support member in an inclined state such that a target corner portion that is one of a plurality of corner portions of the mounting surface is located lower than the other corner portions, and wherein the transport device is displaceable relative to the support mechanism between a first position where the transport device supports the second support member so that the second support member is movable along the transport device and a second position where the support mechanism supports the second support member.

2. The article transfer facility according to claim 1, wherein the transfer device performs the first operation according to a first coordinate system, and performs the second operation according to a second coordinate system that is different from the first coordinate system, and wherein the second coordinate system is inclined relative to a horizontal plane according to an inclination of the second support member supported by the support mechanism.

3. The article transfer facility according to claim 1, wherein the transfer device performs the second operation on the plurality of articles so as to arrange the articles in a reference direction that is a direction along one of four sides of the mounting surface, with reference to the target corner portion that serves as a reference point.

4. The article transfer facility according to claim 1,
wherein the support mechanism supports the second support member in an inclined state such that the mounting surface is inclined downward in a direction toward the transfer device.

5. The article transfer facility according to claim 1,
wherein the support mechanism is located at the predetermined position on a transport path of the transport device.

6. The article transfer facility according to claim 2,
wherein the transfer device performs the second operation on the plurality of articles so as to arrange the articles in a reference direction that is a direction along one of four sides of the mounting surface, with reference to the target corner portion that serves as a reference point.

7. The article transfer facility according to claim 2,
wherein the support mechanism supports the second support member in an inclined state such that the mounting surface is inclined downward in a direction toward the transfer device.

8. The article transfer facility according to claim 3,
wherein the support mechanism supports the second support member in an inclined state such that the mounting surface is inclined downward in a direction toward the transfer device.

9. The article transfer facility according to claim 2,
wherein the support mechanism is located at the predetermined position on a transport path of the transport device.

10. The article transfer facility according to claim 3,
wherein the support mechanism is located at the predetermined position on a transport path of the transport device.

11. The article transfer facility according to claim 4,
wherein the support mechanism is located at the predetermined position on a transport path of the transport device.

12. The article transfer facility according to claim 1,
wherein the transport device includes an inclined conveyor located at the predetermined position,
wherein the support mechanism includes a plurality of support members that support the second support member, and a swing unit that swings the inclined conveyor relative to the plurality of support members, and
wherein the swing unit swings the inclined conveyor between the first position where the inclined conveyor supports the second support member and a second position where the plurality of support members support the second support member.

13. The article transfer facility according to claim 12,
wherein one or more support members of the plurality of support members, other than two support members located at two ends in a direction in which the transport device transports the second support member, are configured to move to a position where the one or more support members do not support the second support member.

\* \* \* \* \*